United States Patent
Lomen et al.

(10) Patent No.: US 11,637,577 B1
(45) Date of Patent: Apr. 25, 2023

(54) SIGNAL CORRELATION ESTIMATOR AND DETECTOR

(71) Applicant: BAE Systems Information and Electronic Systems Integration Inc., Nashua, NH (US)

(72) Inventors: Brandt J. Lomen, Bedford, NH (US); Steven R. Grimes, Brookline, NH (US); Matthew Anderson, Mont Vernon, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/584,793

(22) Filed: Jan. 26, 2022

(51) Int. Cl.
*H04L 41/06* (2022.01)
*H04B 1/16* (2006.01)

(52) U.S. Cl.
CPC .................................. *H04B 1/16* (2013.01)

(58) Field of Classification Search
CPC ..... H04L 63/14; H04L 63/1441; H04L 41/06; H04L 63/1425
See application file for complete search history.

(56) References Cited

U.S. PATENT DOCUMENTS

| | | | | |
|---|---|---|---|---|
| 2003/0096606 A1* | 5/2003 | Inman | ................... | H04L 41/142 455/423 |
| 2007/0104297 A1* | 5/2007 | Gorday | ................. | H04B 1/707 375/150 |
| 2014/0343399 A1* | 11/2014 | Posse | ................... | A61B 5/7203 600/410 |
| 2020/0081111 A1* | 3/2020 | Hoshuyama | .......... | G01S 13/584 |
| 2022/0179764 A1* | 6/2022 | Chan | ................... | G06F 11/0778 |

OTHER PUBLICATIONS

Srivastava Gyan P et al., "Functional Annotation from Meta-Analysis of Microarray Datasets", IEEE International Conference on Bioinformatics and Biomedicine, IEEE Computer Society, 2008, 5 pages.

Bonett, D.G. (2017) An Introduction to Meta-analysis. Retrieved from http://people.ucsc.edu/~dgbonett/meta.html, 57 pages.

* cited by examiner

*Primary Examiner* — Aristocratis Fotakis
(74) *Attorney, Agent, or Firm* — Finch & Maloney PLLC

(57) ABSTRACT

A method is provided for correlating signals. The method includes receiving a plurality of data vectors representing a plurality of signals. The method further includes determining, for each of the data vectors, a first set of correlation coefficients, where each of the correlation coefficients in the first set is based on a direct cross-correlation between each of the data vectors. The method further includes calculating an average of the first set of correlation coefficients, and determining, for each of the data vectors, a second set of correlation coefficients, where each of the correlation coefficients in the second set are based on an indirect cross-correlation between each of the data vectors and the average of the first set of correlation coefficients. The method further includes detecting a correlation between at least two of the data vectors based on the second set of correlation coefficients.

20 Claims, 13 Drawing Sheets

US 11,637,577 B1

SIGNAL CORRELATION ESTIMATOR AND DETECTOR

STATEMENT OF GOVERNMENT INTEREST

This invention was made with United States Government assistance under Contract No. 17-D-1717/21-F-1003, awarded by the United States Government. The United States Government has certain rights in this invention.

FIELD OF DISCLOSURE

The present disclosure relates to signal processing, and more particularly, to techniques for analyzing signal data and generating iterative correlations between the data.

BACKGROUND

Data correlation is used to identify and describe the mutual relations that exists between two or more sets of data. For example, correlation between signals indicates the degree to which one signal resembles another signal. Signal correlation is useful in many applications, such as electronic support measures (ESM) for electromagnetic surveillance and threat recognition by correlating sources of radiated electromagnetic energy with known signatures. In complex signal environments, such correlation can involve multiple variable signal parameters, which increases the difficulty of obtaining an accurate and useful understanding of the nature of the signal. For example, if some of the signal parameters represent indirect relationships between nodes, such as when the signals are affected by additional, potentially unknown nodes, then it may not be possible to accurately correlate the signals using existing techniques. Therefore, non-trivial issues remain with respect to signal correlation.

Figure 1:
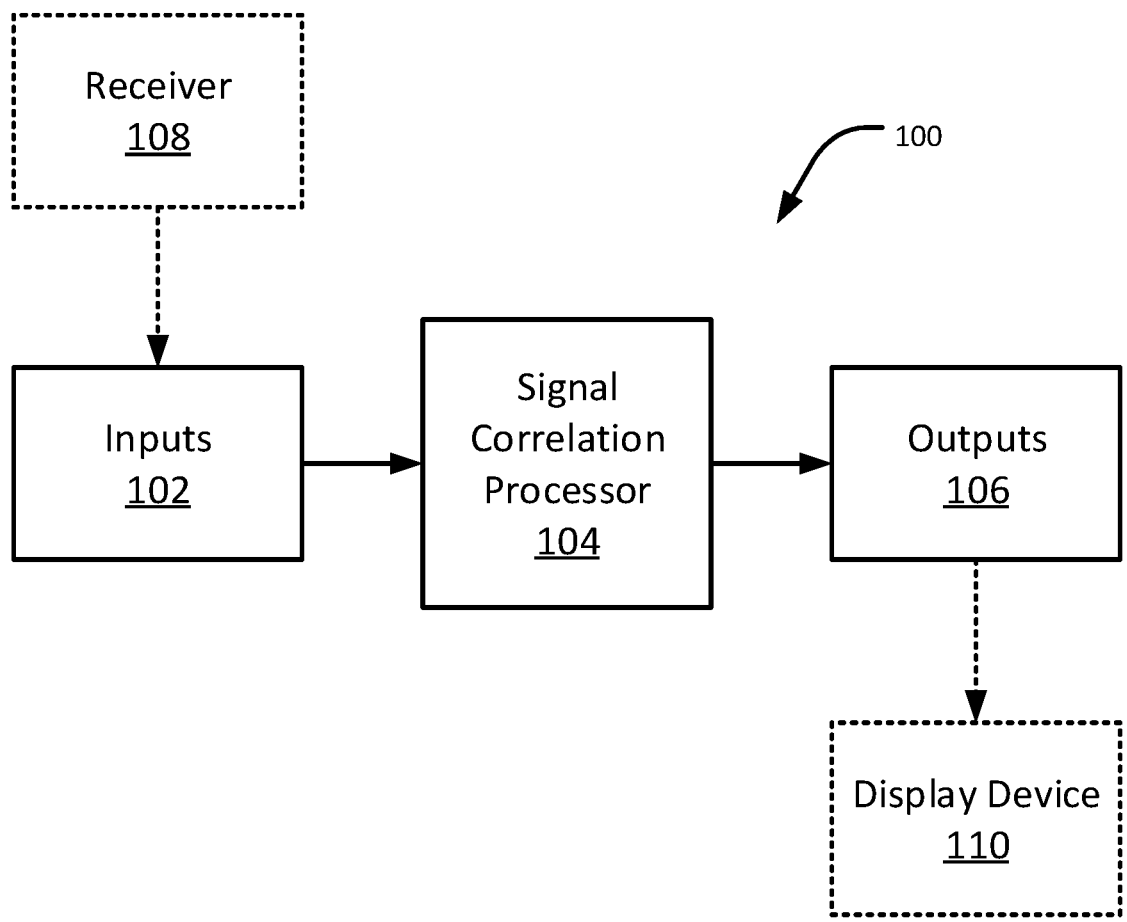
FIG. 1 is a block diagram of an example system for signal correlation, in accordance with an embodiment of the present disclosure.

Although the following detailed description will proceed with reference being made to illustrative embodiments, many alternatives, modifications, and variations thereof will be apparent in light of this disclosure.

DETAILED DESCRIPTION

Overview

In accordance with an embodiment of the present disclosure, a method is provided for correlating signals. The method includes receiving a plurality of data vectors representing a plurality of signals. For example, each of the vectors can represent signal parameters in a time domain. The method further includes determining, for each of the data vectors, a first set of correlation coefficients, where each of the correlation coefficients in the first set is based on a direct cross-correlation between each of the data vectors. The method further includes calculating an average of the first set of correlation coefficients, and determining, for each of the data vectors, a second set of correlation coefficients, where each of the correlation coefficients in the second set are based on an indirect cross-correlation between each of the data vectors and the average of the first set of correlation coefficients. The method further includes detecting a correlation between at least two of the data vectors based on the second set of correlation coefficients. The detection can be performed, for example, using a binary hypothesis detector and/or a probability estimator. Correlated data vectors are then grouped together as an output.

As noted above, there are non-trivial problems associated with data correlation, particularly in large and complex multi-dataset environments. For example, if a given signal has three parameters, there may be a correlation between two of the parameters but no correlation, or a limited correlation, of either of the first two parameters with the third parameter. In some existing techniques, meta-analysis is used to establish correlation statistics by systematically synthesizing or combining the analysis results of several randomly selected sets of data. However, such techniques presume a correlation is present, which can lead to inaccurate results if the any of the data is not correlated in fact, such as in the example above. Thus, by assuming a prior correlation, the robustness of the analysis is reduced.

In accordance with embodiments of the present disclosure, techniques are disclosed for analyzing large quantities of data and forming iterative correlations. The disclosed techniques can be used with any type of data, and in particular, multi-dataset systems such as large communication or sensor networks. In contrast to some existing techniques, the embodiments of the present disclosure do not assume a correlation is present. Rather, a meta-analysis and/or a direct analysis is used to first determine if any prior correlations exist. This allows the disclosed techniques to be more versatile for determining the actual correlations and sorting out any unrelated data that have no correlations.

Example Signal Correlation System

FIG. 1 is a block diagram of an example system 100 for signal correlation, in accordance with an embodiment of the present disclosure. The system 100 includes a signal correlation processor 104 configured to receive inputs 102 and to produce outputs 106. The inputs 102 and the outputs 104 include vectors of data. In some examples, the inputs 102 and the outputs 104 include groups of correlated vectors. For example, if the inputs 102 include three vectors numbered 1, 2, and 3, and vectors 1 and 3 are correlated while vector 2 is not correlated, then a group can include the correlated vectors 1 and 3, but not vector 2. In some examples, the inputs 102 represent signals received via a signal receiver 108 (e.g., an electronic device for accepting signals and converting the signals into data), although it will be understood that the inputs 102 can represent any type of data received from any source, such as a radar, antenna, camera, sensor, oscilloscope, electronic test instrument, or other device that generates or otherwise produces electronic signals. In some examples, the outputs 106 are provided to a display device 110 (e.g., a monitor or printer) in a human readable format.

In some embodiments, the system 100 can be used in tactical networks including, but not limited to, intelligence, surveillance and reconnaissance (ISR) networks for ensuring reliable operation and situational awareness, Blue Force Tracking (BFT) systems for reducing incidents of friendly fire, electronic warfare (EW) systems for maintaining reliable electronic attack and support operations, and other network-centric operations for enhanced effectiveness. As will be described in further detail below, meta-analysis can be used to supplement direct information in the system 100 to allow for quicker and more accurate signal correlation, which is beneficial for tactical applications such as noted above where rapid signal processing can improve the accuracy, efficiency, and effectiveness of such operations.

As will be described in further detail below, the signal correlation processor 104 analyzes the inputs 102 to identify correlated vectors and to produce, as the outputs 104, one or more groups of vectors that are correlated and/or other correlation statistics that can be used to further analyze the relationships between the vectors and/or groups of vectors in the inputs 102. The signal correlation processor 104 does not presume that any of the inputs 102 are correlated when performing the analysis.

Figure 3:
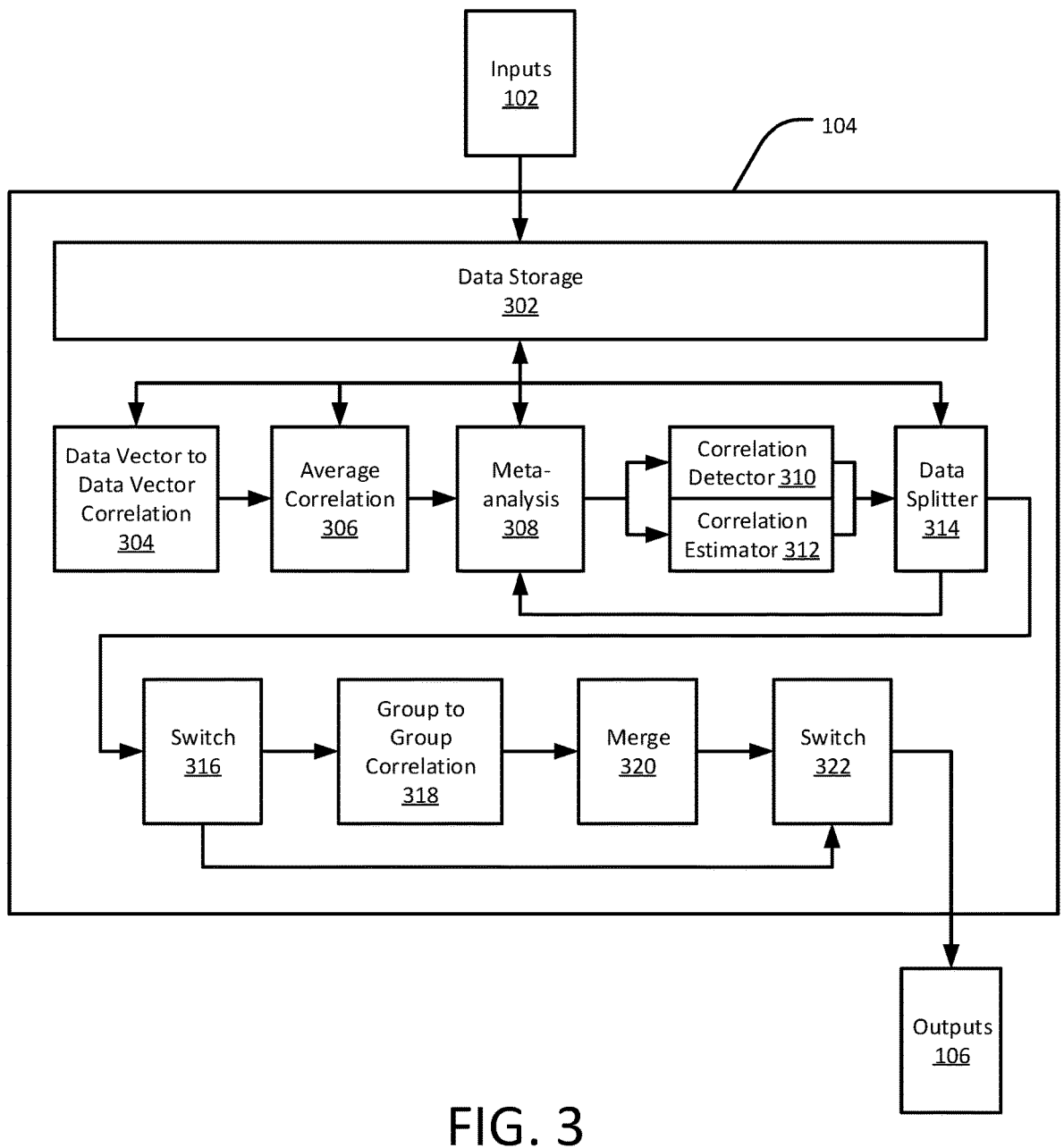
FIG. 3 is a block diagram of a signal correlation processor of the system of FIG. 1, in accordance with an embodiment of the present disclosure.

Other componentry and functionality not reflected in FIGS. 1 and 3 will be apparent in light of this disclosure, and it will be appreciated that other embodiments are not limited to any particular hardware configuration. For example, the processor 104 is configured to perform the functions of system 100, such as described herein and with respect to FIG. 3. The processor 104 can be any suitable processor and may include one or more coprocessors or controllers. In some embodiments, the processor 104 can be implemented as any number of processor cores. The processor 104 (or processor cores) can be any type of processor, such as, for example, a micro-processor, an embedded processor, a digital signal processor (DSP), a graphics processor (GPU), a network processor, a field programmable gate array or other device configured to execute code. The processor 104 can include multithreaded cores in that they may include more than one hardware thread context (or "logical processor") per core. The processor 104 can be implemented as a complex instruction set computer (CISC) or a reduced instruction set computer (RISC) processor.

The processor 104 can be configured to execute an operating system (OS), such as Google Android (by Google Inc. of Mountain View, Calif.), Microsoft Windows (by Microsoft Corp. of Redmond, Wash.), Apple OS X (by Apple Inc. of Cupertino, Calif.), Linux, or a real-time operating system (RTOS). As will be appreciated in light of this disclosure, the techniques provided herein can be implemented without regard to the particular operating system provided in conjunction with the system 100, and therefore may also be implemented using any suitable existing systems or platforms. It will be appreciated that in some embodiments, some of the various components of the system 100 can be combined or integrated in a system-on-a-chip (SoC) architecture. In some embodiments, the components may be hardware components, firmware components, software components or any suitable combination of hardware, firmware or software.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

Figure 2:
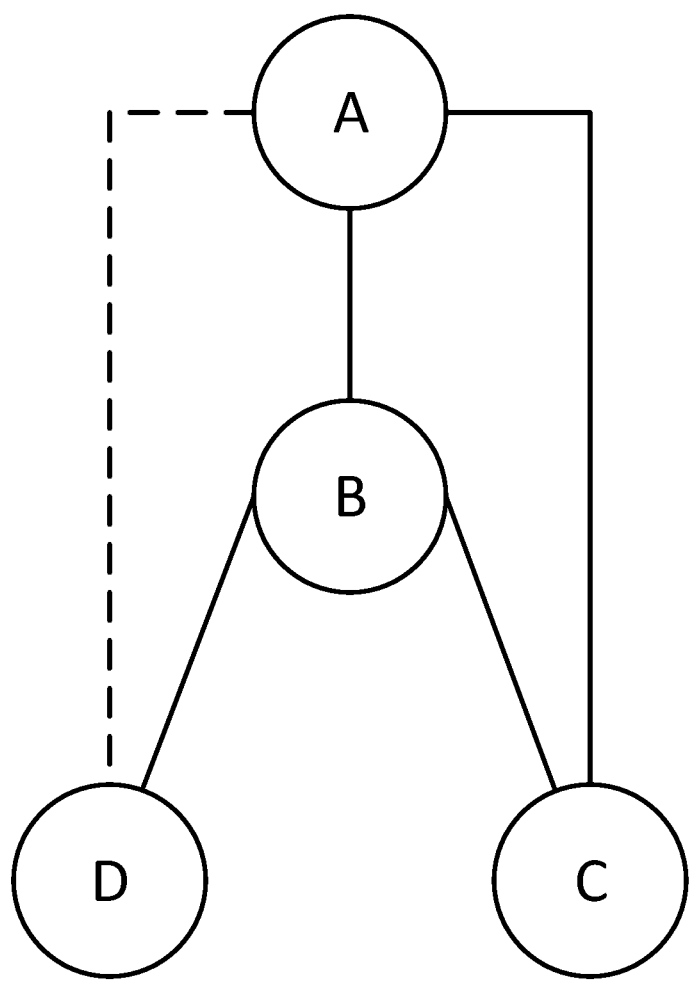
FIG. 2 is a diagram showing relationships between several signal nodes, in accordance with an example of the present disclosure.

FIG. 2 is a diagram showing relationships between several signal nodes, in accordance with an example of the present disclosure. In this example, the solid lines represent known relationships between nodes A, B, C, and D, and dashed lines represent unknown relationships between nodes A and D. In some examples, the signal correlation processor 104 is designed to work in any type of system with any type of data, including multiple dataset environments, such as large communication or sensor networks where some of the relationships between the data are known and some of the relationships between the data are unknown, such as shown in FIG. 2. The signal correlation processor 104 is configured to extrapolate, from the inputs 102, any relationships between the data as a whole, whether they are known or unknown.

FIG. 3 is a block diagram of the signal correlation processor 104 of FIG. 1, in accordance with an embodiment of the present disclosure. The signal correlation processor 104 includes a data storage 302, a data vector to data vector correlation module 304, an average correlation module 306, a meta-analysis module 308, a correlation detector 310, a correlation estimator 312, a data splitter 314, switches 316 and 322, a group to group correlation module 318, and a merge module 320. The data storage 302 is coupled to the inputs 102, the data vector to data vector correlation module 304, the average correlation module 306, the meta-analysis module 308, and the data splitter 314. The data storage 302 provides a memory (persistent and/or non-persistent) for storing data during processing by the various components of the signal correlation processor 104. The data storage 302 can be implemented using any suitable type of digital storage including, for example, a volatile memory device such as a RAM, dynamic RAM (DRAM), or static RAM (SRAM) device.

In overview, the signal correlation processor 104 is configured to analyze the inputs 102 to determine which, if any, data vectors are correlated. The data vector to data vector correlation module 304 provides a correlation coefficient (e.g., between −1 and +1) based on a direct cross-correlation between every vector in the inputs 102, compensating for any time domain lag in the signals. The average correlation module 306 provides a weighted average of the correlation coefficients. The meta-analysis correlation module 308 supplements the direct cross-correlation, which allows for the formation of stronger statistics with less data, based on the weighted average of the correlation coefficients. The correlation detector 310 and the correlation estimator 312 operate in parallel using the output of the meta-analysis correlation module 308. The correlation detector 310 is configured to determine whether the data vectors of the inputs 102 are correlated or not correlated using a Neyman-Pearson binary hypothesis detector. The correlation estimator 312 determines the probability of correlation and probability of no correlation based on user-determined thresholds. These probabilities provide additional granular information that is not provided by the correlation detector 310, which has a binary output.

The data splitter 314, the group to group correlation module 318, and the merge module 320 are configured to split up large groups and then merge them back together, which allows for an overall reduction in processing. The switches 316 and 322 can be used to bypass the merging, if desired, prior to producing the outputs 106. Further details about the signal correlation processor 104 are described below with respect to an example use case referred to as binned time.

Binned Time

Figure 4:
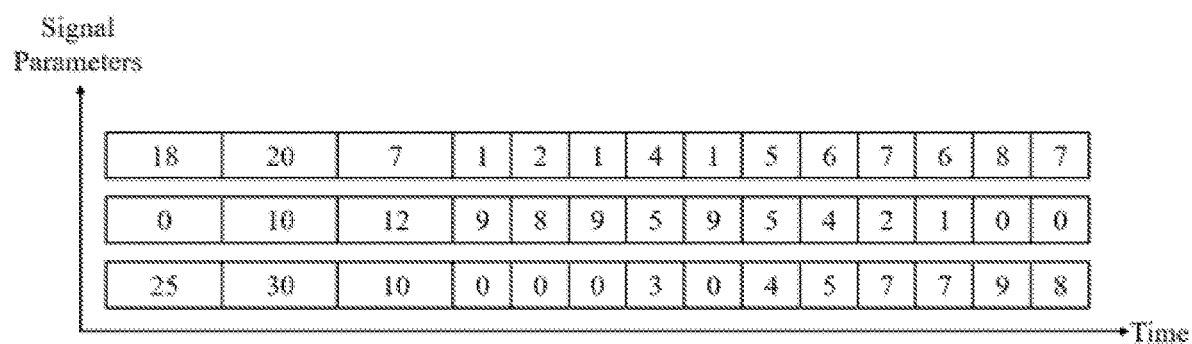
FIG. 4 is a table of example vectors that can be provided as an input to the signal correlation processor of FIG. 2, in accordance with an embodiment of the present disclosure.

FIG. 4 is a table of example vectors for a signal parameter feeder function, referred to as binned time, that can be provided as the input 102 to the signal correlation processor 104, in accordance with an embodiment of the present disclosure. In this example, binned time includes signal parameters. It will be understood that the disclosed techniques are not limited to signal analysis and can be applied in other applications where multiple sets of data are present. The feeder function creates a multi-dimensional histogram with one axis in time and the other axis representing a signal parameter, which is based on how many instances of signals occurred in a given time bin and a given signal parameter bin. In FIG. 4, each number represents the number of signals that occurred with given signal parameters and within a given portion of time.

For example, the histogram bins in FIG. 4 can be converted into vectors $Param_1$, $Param_2$, $Param_3$ as shown below:

$Param_1$=<18,20,7,1,2,1,4,1,5,6,7,6,8,7>
$Param_2$=<0,10,12,9,8,9,5,9,5,4,2,1,0,0>
$Param_3$=<25,30,10,0,0,0,3,0,4,5,7,7,9,8>

Note that each parameter represents an individual bin within the signal parameter units. For instance, the first parameter values 18, 0, and 25 of the three vectors are all in the first time bin.

Figure 5:
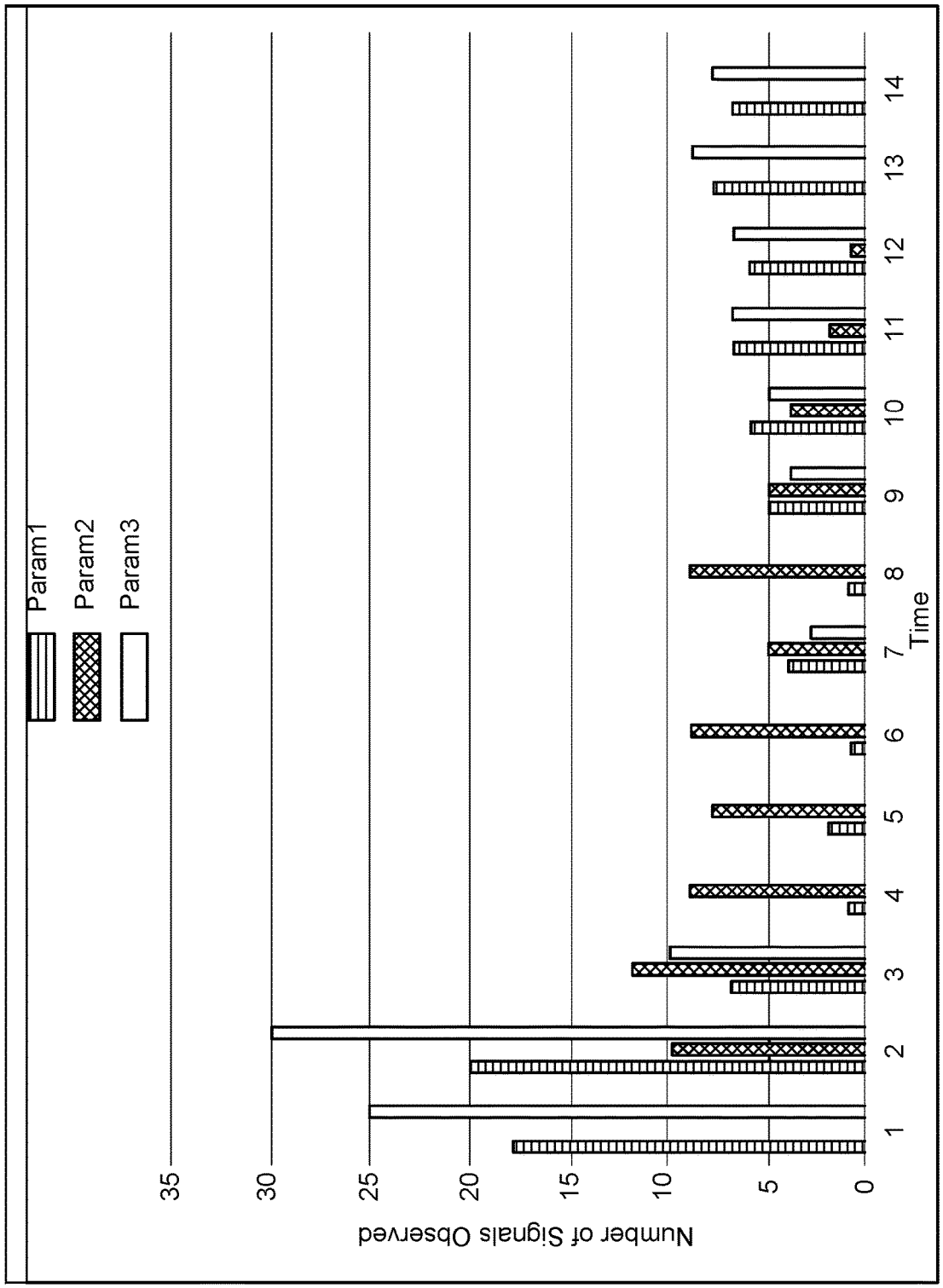
FIG. 5 is a table of signal parameter histograms for the vectors of FIG. 4, in accordance with an example of the present disclosure.

FIG. 5 is a table of signal parameter histograms for the vectors $Param_1$, $Param_2$, $Param_3$ of FIG. 4, showing the number of signals observed in each time bin. It can be seen in FIG. 5 that $Param_2$ does not follow a similar trajectory as $Param_1$ and $Param_3$, which suggests that $Param_2$ is not correlated with the other parameters.

Figure 6:
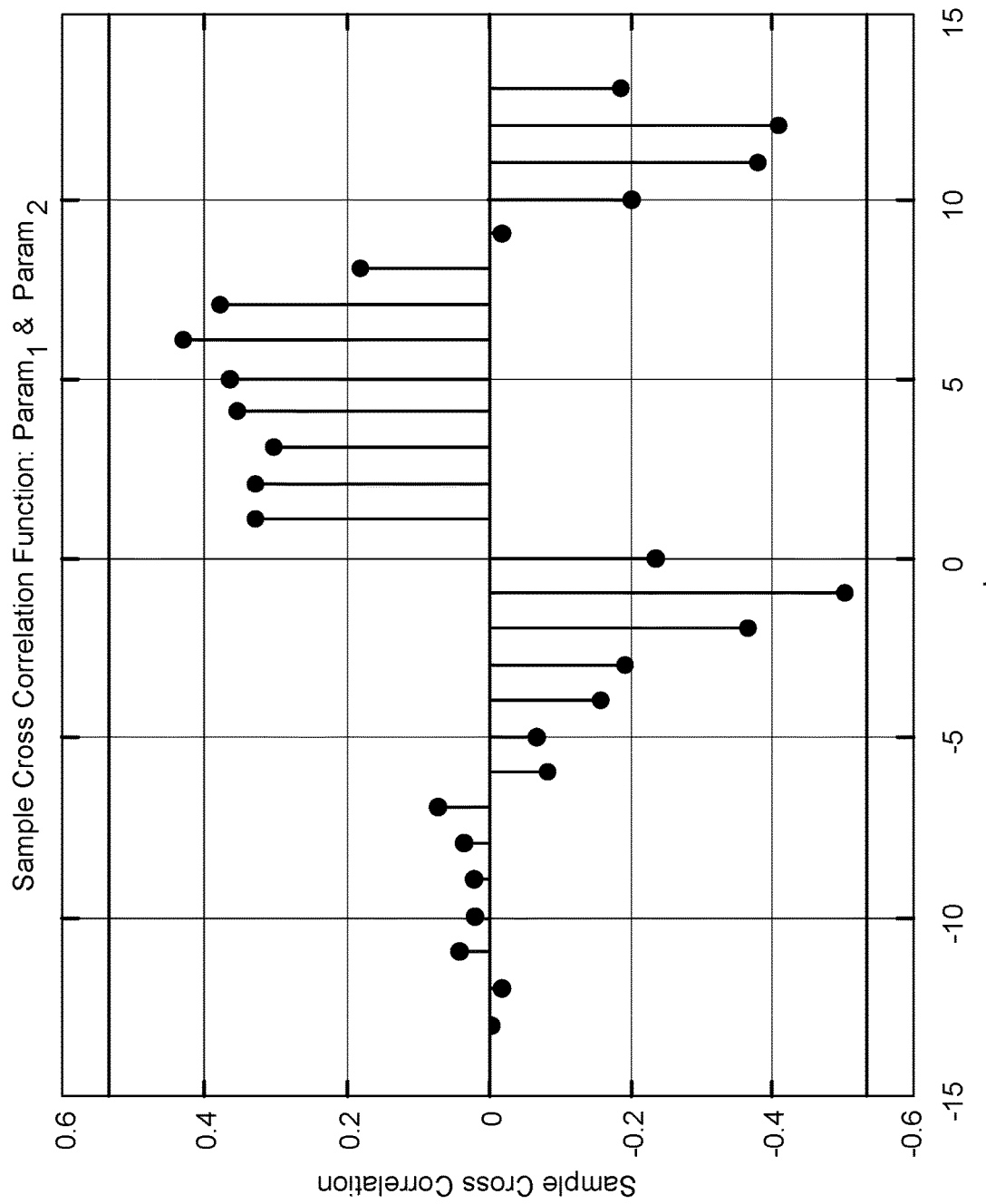
FIGS. 6, 7, and 8 each show the result of individual cross-correlations between the signal parameter histograms of FIG. 5, in accordance with an example of the present disclosure.
Figure 7:
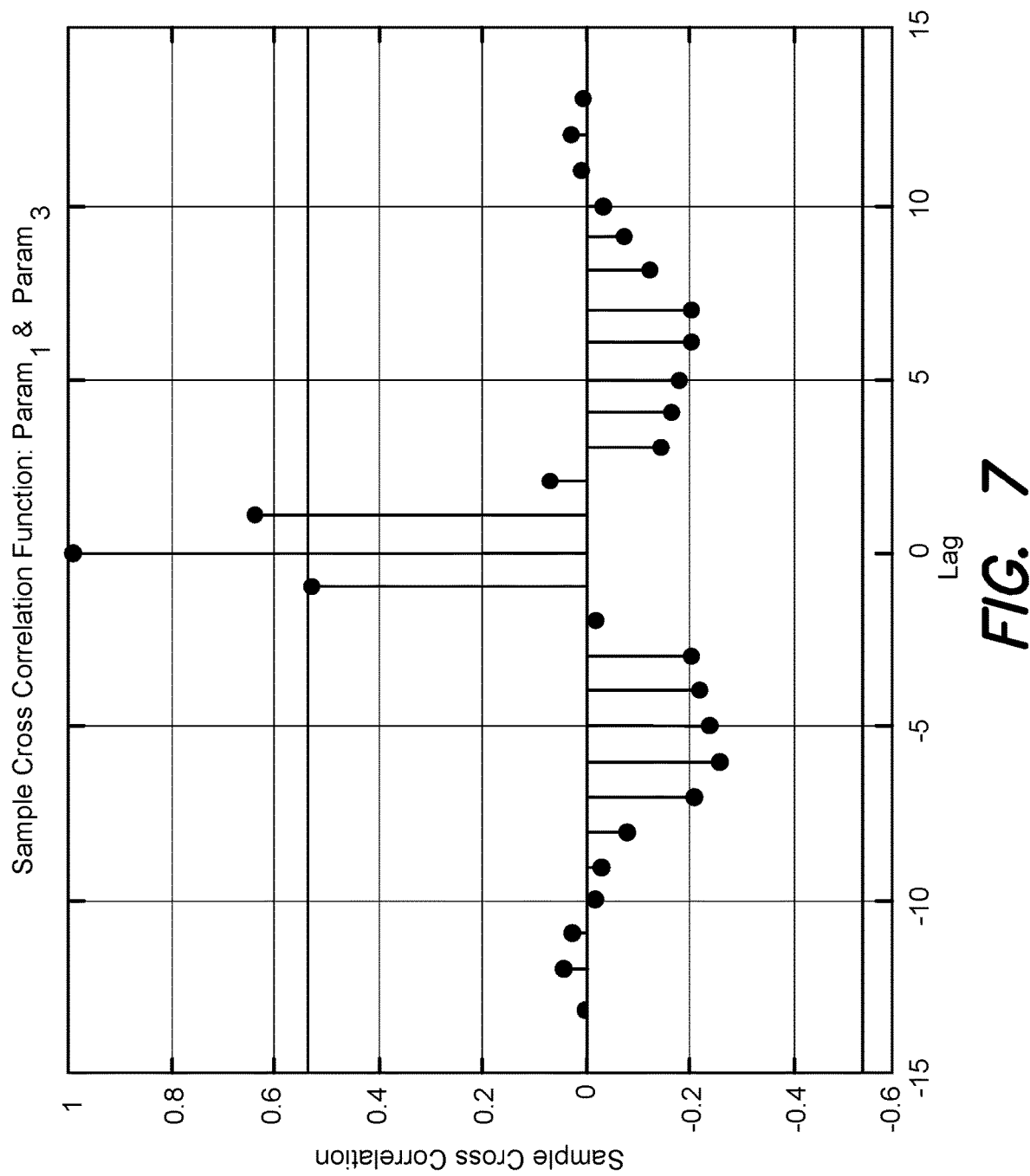
Figure 8:
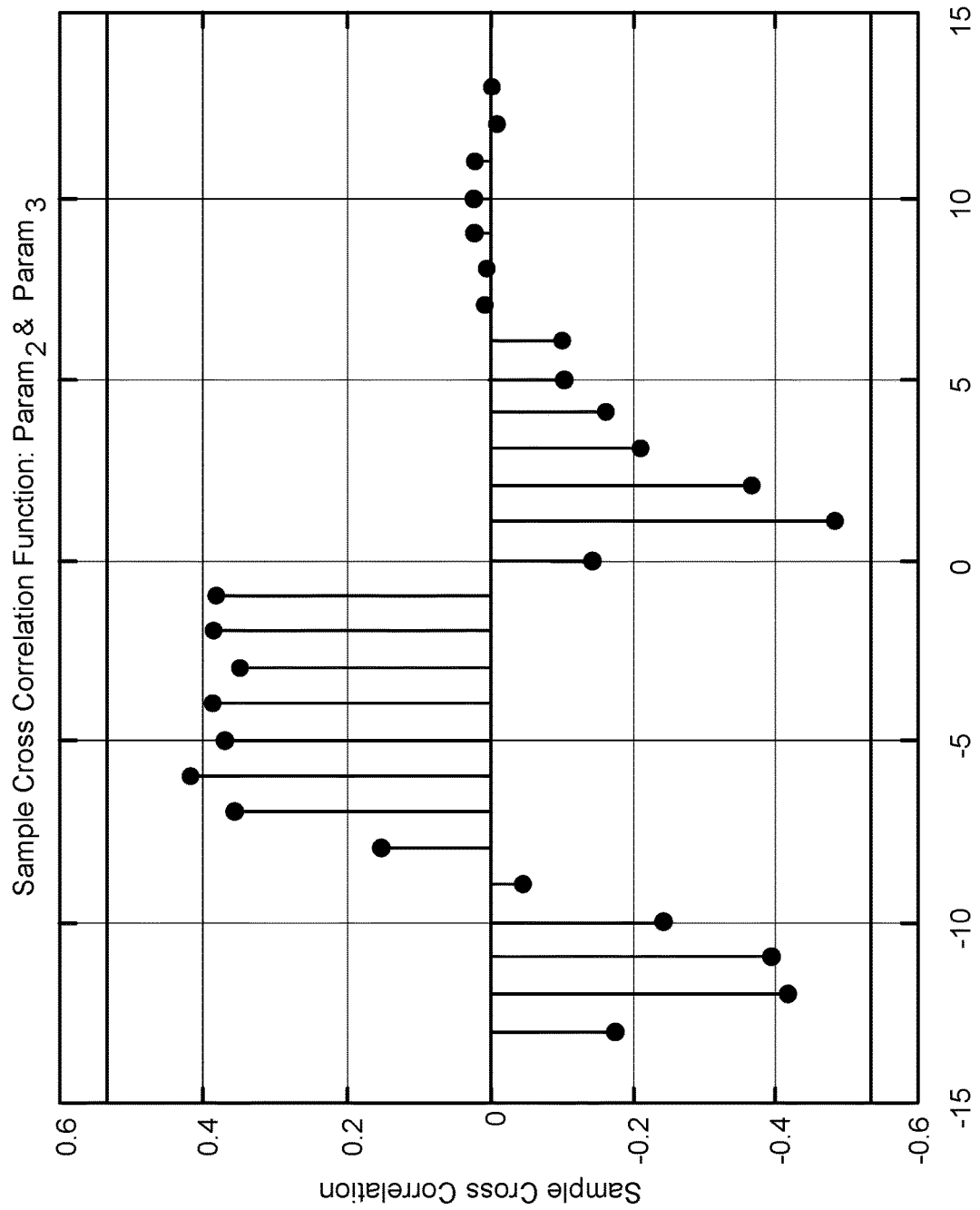

To obtain further correlation detail for binned time, the signal correlation processor 104 analyzes the correlation coefficients of the signal parameters over time. FIGS. 6, 7, and 8 each show the result of the individual cross-correlations between the parameter histograms defined above. The peaks show the cross-correlation coefficient (vertical axis) at a given lag value (horizontal axis). FIGS. 6 and 8 show a limited cross-correlation of less than 0.6 between $Param_1$ and $Param_2$ and between $Param_2$ and $Param_3$, whereas FIG. 7 shows a strong cross-correlation between $Param_1$ and $Param_3$. In this example, the data illustrate the appearance of both correlated (FIG. 7) and uncorrelated histograms (FIGS. 6 and 8). By observing the cross-correlation, the higher peak of the correlation between $Param_1$ and $Param_3$ in FIG. 7 indicates that these two signal parameters are correlated. $Param_2$, however, indicates no correlation with any other parameter due to the lower peaks of the correlation coefficients. Binned time shows correlated signal parameters across multiple variables. By understanding the correlation between the signal parameters, a better understanding of the signal source (e.g., an emitter) can be provided, such as for use with Electronic Support Measures.

Figure 9:
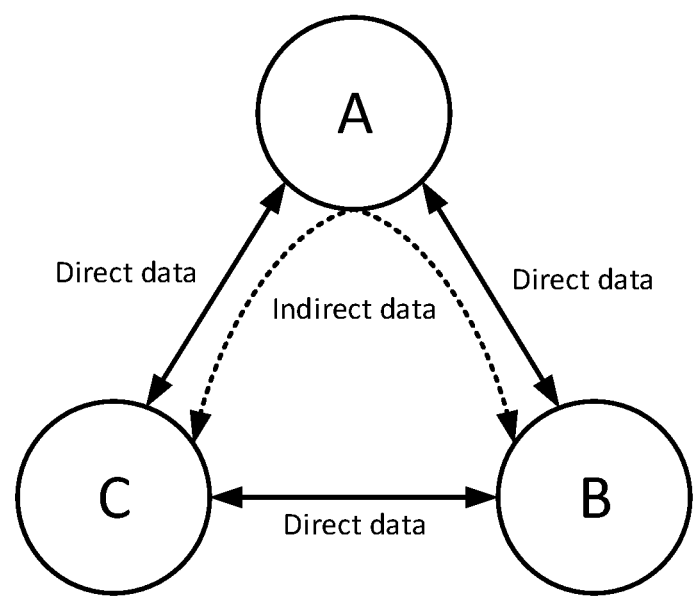
FIGS. 9, 10, and 11 are node diagrams showing data used for identifying relationships between signal nodes, in accordance with an example of the present disclosure.
Figure 10:
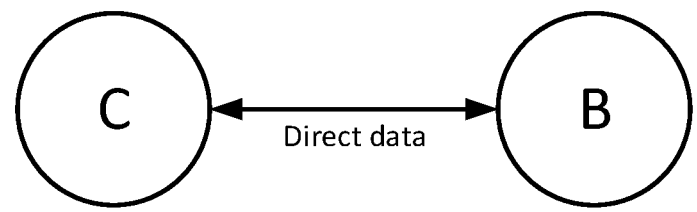

FIG. 9 is a node diagram showing all data that is used for identifying a relationship between nodes (e.g., between nodes B and node C). For example, FIG. 9 shows that there are direct data relationships between nodes A, B, and C, and indirect data relationships between nodes B and C (via node A). Direct data can be used to identify correlations because it has a relatively low risk of producing an incorrect correlation. However, in a network of nodes, such as shown in FIG. 9, data can be exchanged between other, non-direct links. For example, the link that connects C to A and A to B can be ignored in a direct analysis of nodes B and C, such as shown in FIG. 10. In some cases, direct data is less useful when limited data are present, or in a time-domain system where direct data analysis is delayed until a sufficient quantity of data arrives. To this end, some embodiments of the present disclosure use meta-analysis data to supplement the direct data, which allows for the formation of stronger statistics using less data overall.

Figure 11:
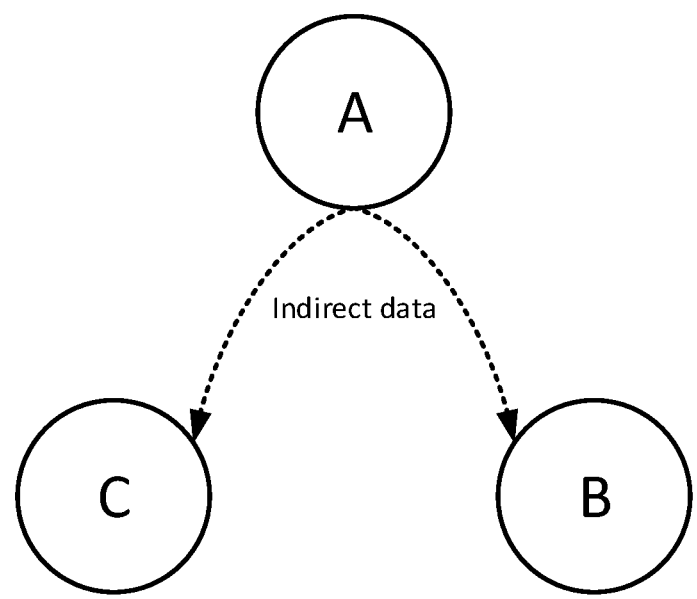

Meta-analysis algorithms are used to relate studies that have a common data reference. For example, when a medication is being tested, a control group is used. The control is given a placebo. Two different medicines can be compared by generating a meta-analysis relationship based on their common placebo study. In the example shown in FIG. 11, node A can be considered the placebo while node B and node C are the different medications that are being compared to identify any correlation using indirect data. If there is a direct study relating node B and C, then meta-analysis does not use the direct data. Referring back to the example of FIG. 9, this scenario shows that there is direct data relating all nodes to one another. However, if only the meta-analysis relationship, as shown in FIG. 11, is used, the direct nodal relationship between nodes B and C can be ignored.

Referring again to FIG. 3, in accordance with an embodiment, vectors 1 through N are 1×M dimensional datasets that the signal correlation processor 104 uses to identify correlated groups of vectors in the inputs 102. The data are automatically split (by the data splitter 314) and merged (by the merge module 320) over multiple iterations of meta-analysis (by the meta-analysis module 308, the correlation detector 310, and the correlation estimator 312) based on the combinations of groups and vector data, which aids in overall process and reduces risk of incorrect correlation.

The data vector to data vector correlation module 304 provides a direct cross correlation between every vector using the following equation, where a correlation coefficient is denoted as $r_{xy}$ and the limitations on each of the summations are the lengths of the vectors x and y.

$$r_{xy} = \frac{\sum (x_{i-lag} - \bar{x})(y_i - \bar{y})}{\sqrt{\sum (x_{i-lag} - \bar{x})^2 \sum (y_i - \bar{y})^2}} \quad (1)$$

The correlation coefficient $r_{xy}$ ranges from −1 (negative correlation) to +1 (positive correlation). In this equation, lag is an adjustable setting that allows for delayed correlation. For example, the correlation of acoustic signals when separated by a large distance require a time domain lag to ensure that the correlation is performed at the correct interval to account for the speed of sound. For most applications, lag has a direct effect on sensitivity. For instance, the larger the lag, the more likely a correlation will be found. However, an improper lag setting may increase the risk of false correlations. If time domain data is not in use, lag may be set to 0; however, when data may be offset, lag may be set to a value large enough to account for the maximum possible lag. For example, lag can be up to the largest possible offset between two vectors. The cross correlation is then completed by sweeping from negative lag to positive lag. In other words, if lag is set to 2, the offset between the two vectors is swept as −2, −1, 0, 1, and 2.

The average correlation module 306 provides a weighted average of the correlation coefficient $r_{xy}$ based on the number of samples used to develop the correlation coefficient $r_{xy}$. A setting can be used to determine how many iterations of the correlation coefficient $r_{xy}$ evaluation are performed. The weighted average can be the number of samples for correlation divided by the total number of samples. For example, if one correlation coefficient uses 10 samples and the next correlation coefficient uses 20 samples, then the weighting is ⅓ and ⅔, respectively.

The meta-analysis correlation module 308 takes the mean of two correlation coefficients $r_{ab}$ and $r_{ac}$ and an estimate of the combined standard deviation $\overline{\sigma_{bc}}$, as shown in the following equations.

$$\overline{r_{bc}} = \frac{(r_{ab} + r_{ac})}{2} \tag{2}$$

$$\overline{\sigma_{bc}} = \sqrt{\frac{(\sigma_{ab}^2 + \sigma_{ac}^2)}{2^2}} \tag{3}$$

In equation (3), sigma is the standard deviation of the correlation coefficient, where both correlation coefficients are given equal weights and the total number of samples is set to two.

The correlation detector 310 is a type of Neyman-Pearson binary hypothesis detector where the vectors are detected as either correlated or not correlated. Neyman-Pearson binary hypothesis detectors work over many samples. For example, the detector can create a correlation coefficient from a vector. If the correlation coefficient is above the Neyman-Pearson threshold, assign it a 1; otherwise assign it a 0. This process is repeated for a given amount of time (e.g., as determined by statistical analysis). If a certain percentage of the samples are "1"s, then it is determined that the total Neyman-Pearson hypothesis is a 1. For example, the correlation coefficient is run seven times with a threshold of 0.5. If four of seven coefficients are above 0.5, then the signals are correlated.

Based on the expected distributions of the observations, the correlation coefficients $r_{xy}$, thresholds are set by the correlation detector based on the following equation:

$$\delta_i = \begin{cases} 1, r \geq r_\gamma \\ 0, r < r_\gamma \end{cases} \tag{4}$$

In equation (4), $r_y$ is the threshold of detection set by the user. For highly noisy systems, the threshold may be set to a lower value, such as between 0.6 to 0.8. For noiseless systems, the value may be set closer to 0.9 or higher. Based on this threshold, a likelihood test can be performed, which generates how many detections within a certain number of samples are a correlation. The equation below is an example of the likelihood test where K is the total number of correlation opportunities and M is the minimum number of detects within K opportunities:

$$\delta_{tot} = \begin{cases} 1, \sum_{i=1}^{N} \delta_i \geq M \\ 0, \sum_{i=1}^{N} \delta_i < M \end{cases} \tag{5}$$

A benefit of the correlation detector 310 is quick correlation detection using a limited amount of data. Direct correlation over multiple iteration provides a sliding window; however, in cases where data is missing, meta-analysis is used to provide multiple additional samples. In this way, as the total number of input vectors increase, correlation can be detected more quickly as each input vector increases the available samples by one.

The correlation estimator 312 operates in parallel with the correlation detector. Based on a Fisher z-transform, the correlation estimator 312 creates two bias estimators to produce two estimates: probability of correlation and probability of no correlation. Each probability is based on thresholds determined by the user. By performing these estimates, the user is provided additional data not provided by the correlation detector 310.

Figure 12:
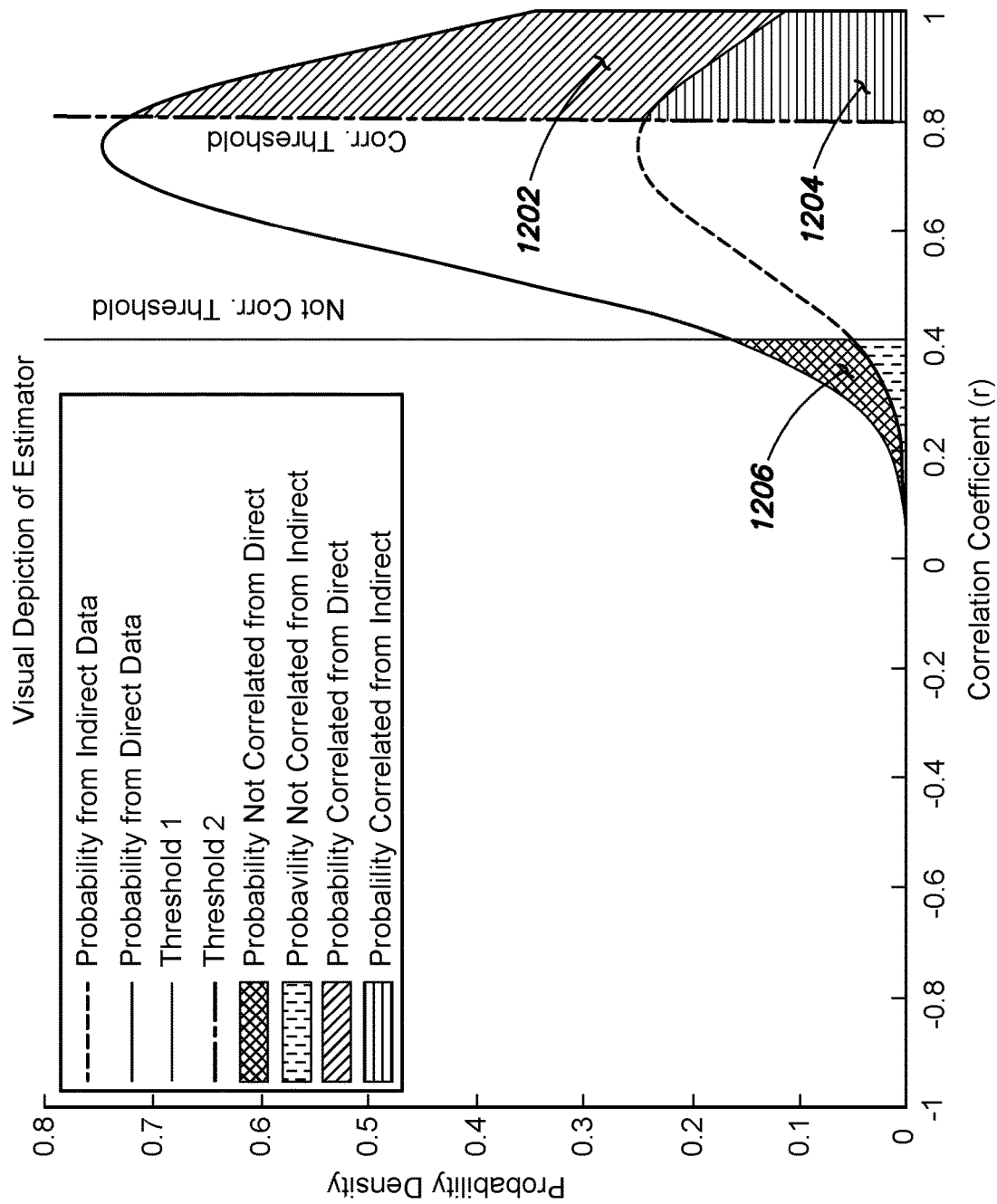
FIG. 12 shows probability densities for both indirect and direct correlation coefficients, in accordance with an example of the present disclosure.

FIG. 12 shows probability densities for both indirect and direct correlation coefficients, in accordance with an example of the present disclosure. In this example, the threshold of correlation is denoted as $r_{\gamma-corr}$ and is set to 0.8. The threshold of no correlation is denoted as $r_{\gamma-\overline{corr}}$ and is set to 0.4. The correlation estimator 312 determines the total probability of correlation by taking the sum of the area 1202 representing the probability correlated from direct data and the area 1204 representing the probability correlated from indirect data. The shaded area 1206 below r=0.4 represents the total probability of no correlation.

A conversion from the mean correlation value is performed using a z-transform, as follows:

$$z_{corr} = \frac{(\text{atanh}(r_{\gamma-corr}) - \text{atanh}(\overline{r}))}{\sqrt{\frac{\overline{\sigma}^2}{(1-\overline{r}^2)^2}}} \tag{6}$$

$$P(corr) = \frac{1}{\sqrt{2\pi}} \int_z^\infty e^{\frac{-x^2}{2}} dx \tag{7}$$

$$z_{\overline{corr}} = \frac{\left(\text{atanh}\left(r_{\gamma-\overline{corr}}\right) - \text{atanh}(\overline{r})\right)}{\sqrt{\frac{\overline{\sigma}^2}{(1-\overline{r}^2)^2}}} \tag{8}$$

$$P(\overline{corr}) = \frac{1}{\sqrt{2\pi}} \int_{-\infty}^{z_{\overline{corr}}} e^{\frac{-x^2}{2}} dx \tag{9}$$

In the above equation, $\overline{r}$ is the average correlation and meta-analysis correlation produced by the average correlation module 306 and the meta-analysis module 308, where P is a probability density function.

The data splitter 314, the group to group correlation module 318, and the merge module 320 are configured to split up large groups and then merge them back together. For example, if correlation estimator 312 determines that certain data vectors are likely not correlated, these data vectors are split from other data vectors and not further used to determine correlation. This allows for overall reduction in correlation iterations as there are fewer vector-to-vector correlations. The group to group correlation module 318 is configured so that any groups that are split can be merged back together, which is useful for large data sets. For example, for N total vectors, the total number of correlations required to complete is $N*(N-1)/2$. By splitting N in two groups, the processing becomes $N/2*(N/2-1)$. Thus, for an input of 100 vectors, there are 4950 correlations for one group and 2450 correlations for two groups.

Example Signal Correlation Use Case

In an example with four signals A, B, C, and D, correlation detection can be achieved as follows. Of the four signals, three have a relationship. Signals A, B, and C are all sinusoid with additive white Gaussian noise. Signal D is a sinusoid over x function (e.g., a sinc function) so the periods of the four signals are correlated but the amplitudes are not.

Data vector to data vector correlation is performed as follows. For $t_0$, the direct correlations are calculated using equation (1) and are shown in Table 1.

TABLE 1

|   | A | B | C | D |
|---|---|---|---|---|
| A | 1 | 0.84 | 0.82 | 0.05 |
| B |   | 1 | 0.65 | 0.12 |
| C |   |   | 1 | 0.12 |
| D |   |   |   | 1 |

Figure 13:
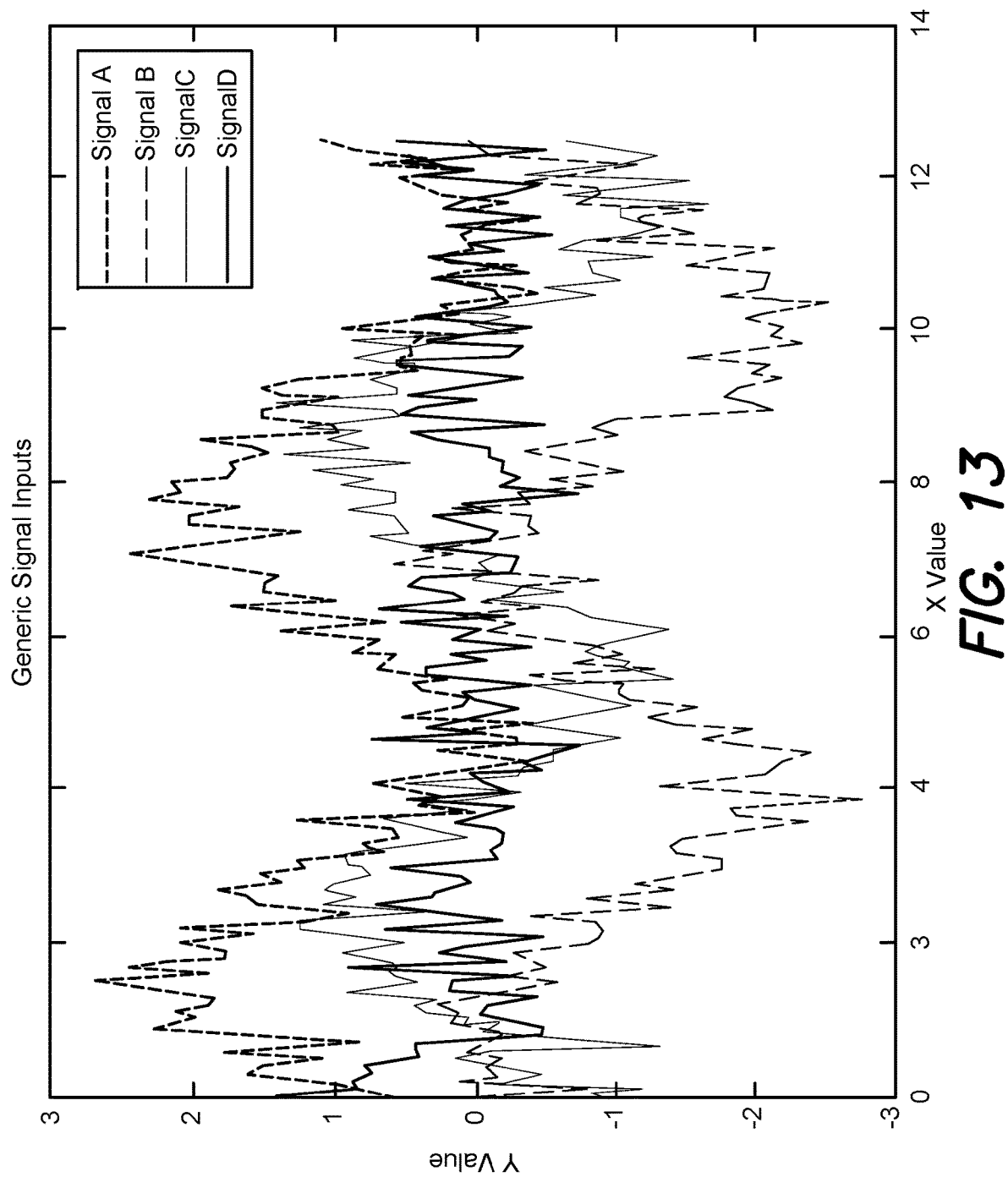
FIG. 13 shows several generations of signal data that can be used as an input to the system of FIG. 1, in accordance with an example of the present disclosure.

Data vector to data vector correlation is completed using five different generations of the signals shown in FIG. 13. The results are shown in Table 2.

TABLE 2

| Correlated Signals | Instance 1 | Instance 2 | Instance 3 | Instance 4 | Instance 5 | Average |
|---|---|---|---|---|---|---|
| A and B | 0.84 | 0.84 | 0.82 | 0.85 | 0.83 | 0.836 |
| A and C | 0.82 | 0.85 | 0.82 | 0.8 | 0.83 | 0.824 |
| A and D | 0.05 | 0.16 | 0.24 | 0.19 | 0.11 | 0.150 |
| B and C | 0.65 | 0.73 | 0.65 | 0.68 | 0.70 | 0.682 |
| B and D | 0.12 | 0.15 | 0.18 | 0.28 | 0.10 | 0.166 |
| C and D | 0.12 | 0.11 | 0.13 | 0.03 | 0.10 | 0.098 |

The indirect meta-analysis correlation metric is calculated using equation (2) with the averaged direct correlation metrics given in Table 2. The indirect correlations are shown in Table 3.

TABLE 3

| Correlated Signals | Through Signal A | Through Signal B | Through Signal C | Through Signal D |
|---|---|---|---|---|
| A and B | — | — | 0.753 | 0.158 |
| A and C | — | 0.759 | — | 0.124 |
| A and D | — | 0.501 | 0.461 | — |
| B and C | 0.830 | — | — | 0.124 |
| B and D | 0.493 | — | 0.390 | — |
| C and D | 0.487 | 0.424 | — | — |

For this example, the detection threshold, $r_\gamma$, is set to 0.7. The number of samples is K=7 and the number of detects is M=3. The results from the detector are shown in Table 4.

TABLE 4

| Correlated Signals | From Direct (Table 2) | From Indirect (Table 3) | Total of 7 |
|---|---|---|---|
| A and B | 5 | 1 | 6 |
| A and C | 5 | 1 | 6 |
| A and D | 0 | 0 | 0 |
| B and C | 2 | 1 | 3 |
| B and D | 0 | 0 | 0 |
| C and D | 0 | 0 | 0 |

Examining Table 4 shows that A, B, and C are correlated. Note that a correlation was detected with fewer time domain opportunities for correlation. Specifically, instead of waiting for seven different time steps, the detector was able to complete the detection in five steps, as shown in the second column of Table 4.

In this example, the estimator correlation threshold is set to the same value as the detector with $r_\gamma=0.7$. The threshold for no correlation is set to $r_\gamma=0.4$. Using these values, the probabilities in Table 5 are computed using equations (6)-(9). Note that without the use of both direct and indirect data, the correlation between signals B and C would have had a probability of less than 50%.

TABLE 5

| Correlated Signals | Probability of Correlation | Probability of No Correlation |
|---|---|---|
| A and B | 79% | 3.5% |
| A and C | 75.6% | 3.35% |
| A and D | 0.005% | 88.2% |
| B and C | 67.4% | 14.2% |
| B and D | 0.023% | 82.1% |
| C and D | 0% | 99.5% |

Based on the results from the correlation detector (Table 4) and the correlation estimator (Table 5), signal D is not correlated with any of the other signals. The outputs 106 of the signal correlation processor 104 are two separate groups of vectors, one with signals A, B, and C, and another with only signal D.

Example Signal Correlation Methodology

Figure 14:
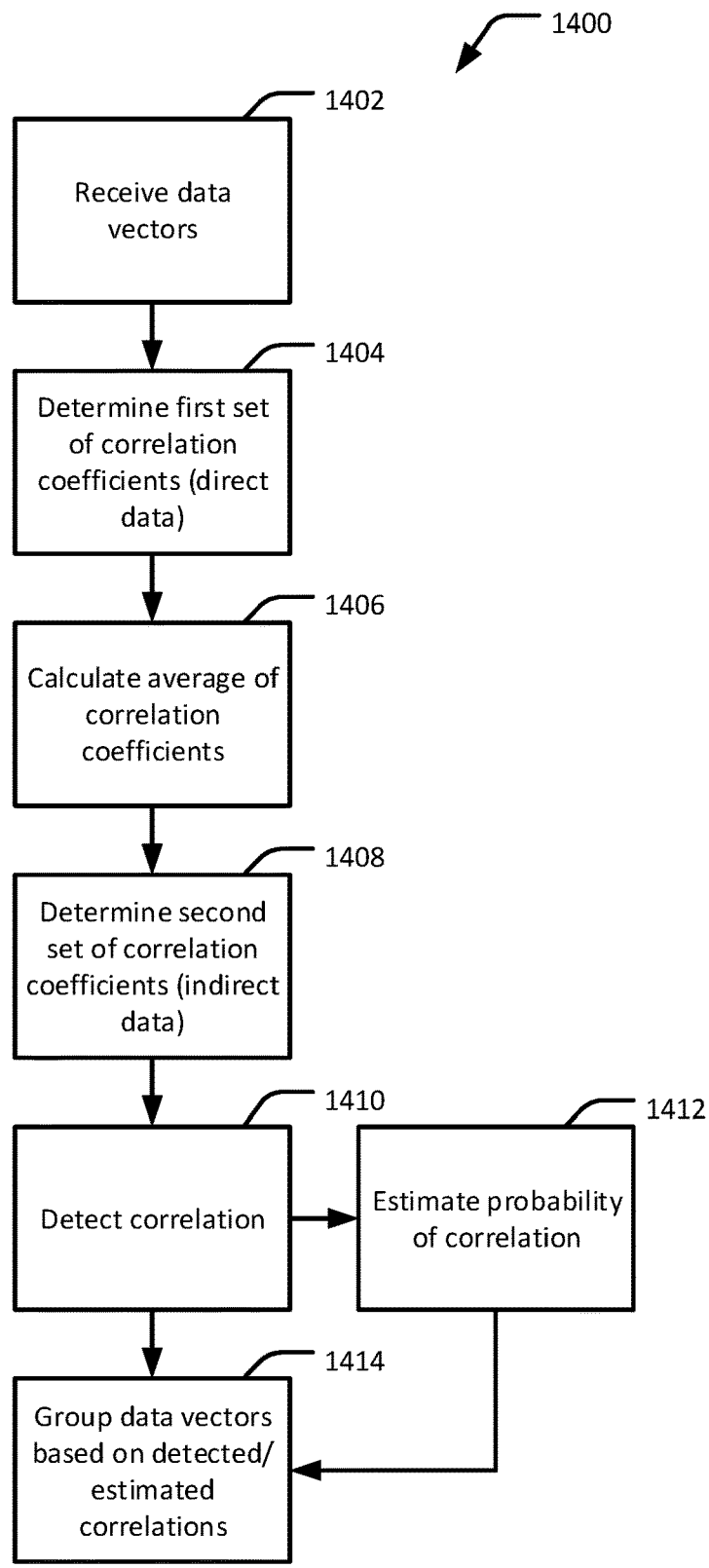
FIG. 14 is a flow diagram of an example methodology for correlating signals, in accordance with an embodiment of the present disclosure.

FIG. 14 is a flow diagram of an example methodology 1400 for correlating signals, in accordance with an embodiment of the present disclosure. The methodology 1400 can be implemented, for example, in the system 100 of FIG. 1. The methodology 1400 includes receiving 1402 a plurality of data vectors representing a plurality of signals. For example, each of the vectors can represent signal parameters in a time domain. The method further includes determining 1404, for each of the data vectors, a first set of correlation coefficients, where each of the correlation coefficients in the first set is based on a direct cross-correlation between each of the data vectors. The method further includes calculating 1406 an average of the first set of correlation coefficients, and determining 1408, for each of the data vectors, a second set of correlation coefficients, where each of the correlation coefficients in the second set are based on an indirect cross-correlation between each of the data vectors and the average of the first set of correlation coefficients. The indirect cross-correlation can be obtained using meta-analysis. The method further includes detecting 1410 a correlation between at least two of the data vectors based on the second set of correlation coefficients. The detection can be performed, for example, using a binary hypothesis detector and/or a probability estimator. In some examples, the probability of correlation can be estimated 1412 using, for example, a bias estimator. Any correlated data vectors are then grouped 1414 together for output by the system. The methodology 1400 can, in some examples, be performed iteratively on subgroups of the input data vectors which are split before analysis and, where correlations are detected, subsequently merged back together for the final grouping(s).

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 provides a method of correlating signals. The method includes receiving, by a processor and via a signal receiver, a plurality of data vectors representing a plurality of signals; determining, by the processor and for each of the data vectors, a first plurality of correlation coefficients each based on a direct cross-correlation between each of the data vectors; calculating, by the processor, an average of the first plurality of correlation coefficients; determining, by the processor and for each of the data vectors, a second plurality of correlation coefficients each based on an indirect cross-correlation between each of the data vectors and the average of the first plurality of correlation coefficients; and detecting, by the processor, a correlation between at least two of the data vectors based on the second plurality of correlation coefficients.

Example 2 includes the subject matter of Example 1, further including estimating, by the processor, a probability that at least two of the data vectors are correlated based on the second plurality of correlation coefficients.

Example 3 includes the subject matter of Example 2, wherein the estimating is performed using a Fisher z-transform.

Example 4 includes the subject matter of any one of Examples 1-3, further including splitting, by a processor, a plurality of data vectors into at least two groups of data vectors, wherein the second plurality of correlation coefficients is determined for each of the at least two groups of data vectors, and wherein the correlation between the at least two of the data vectors is performed for each of the at least two groups of data vectors.

Example 5 includes the subject matter of Example 4, further including merging, by the processor, the correlation between the at least two of the data vectors for each of the at least two groups of data vectors.

Example 6 includes the subject matter of any one of Examples 1-5, wherein the correlation is detected using a Neyman-Pearson binary hypothesis detector.

Example 7 includes the subject matter of any one of Examples 1-6, further including causing, by the processor, a display device to display the correlation.

Example 8 provides a signal correlation system. The system includes at least one receiver configured to receive a plurality of signals, a data storage, and at least one processor coupled to the data storage and configured to execute a process. The process includes receiving, via the at least one signal receiver, a plurality of data vectors representing the plurality of signals; determining, for each of the data vectors, a first plurality of correlation coefficients each based on a direct cross-correlation between each of the data vectors; calculating an average of the first plurality of correlation coefficients; determining, for each of the data vectors, a second plurality of correlation coefficients each based on an indirect cross-correlation between each of the data vectors and the average of the first plurality of correlation coefficients; and detecting a correlation between at least two of the data vectors based on the second plurality of correlation coefficients.

Example 9 includes the subject matter of Example, wherein the process further includes estimating a probability that at least two of the data vectors are correlated based on the second plurality of correlation coefficients.

Example 10 includes the subject matter of Example 9, wherein the estimating is performed using a Fisher z-transform.

Example 11 includes the subject matter of any one of Examples 8-10, wherein the process further includes splitting a plurality of data vectors into at least two groups of data vectors, wherein the second plurality of correlation coefficients is determined for each of the at least two groups of data vectors, and wherein the correlation between the at least two of the data vectors is performed for each of the at least two groups of data vectors.

Example 12 includes the subject matter of Example 11, further comprising merging the correlation between the at least two of the data vectors for each of the at least two groups of data vectors.

Example 13 includes the subject matter of any of Examples 8-12, wherein the correlation is detected using a Neyman-Pearson binary hypothesis detector.

Example 14 includes the subject matter of any of Examples 8-13, further including causing a display device to display the correlation.

Example 15 provides a computer program product including one or more non-transitory machine-readable mediums encoded with instructions that when executed by one or more processors cause a process to be carried out for correlating signals. The process includes receiving, via a signal receiver, a plurality of data vectors representing a plurality of signals; determining, for each of the data vectors, a first plurality of correlation coefficients each based on a direct cross-correlation between each of the data vectors; calculating an average of the first plurality of correlation coefficients; determining, for each of the data vectors, a second plurality of correlation coefficients each based on an indirect cross-correlation between each of the data vectors and the average of the first plurality of correlation coefficients; and detecting a correlation between at least two of the data vectors based on the second plurality of correlation coefficients.

Example 16 includes the subject matter of Example 15, wherein the process further includes estimating a probability that at least two of the data vectors are correlated based on the second plurality of correlation coefficients.

Example 17 includes the subject matter of any of Examples 15 and 16, wherein the process further includes splitting a plurality of data vectors into at least two groups of data vectors, wherein the second plurality of correlation coefficients is determined for each of the at least two groups of data vectors, and wherein the correlation between the at least two of the data vectors is performed for each of the at least two groups of data vectors.

Example 18 includes the subject matter of Example 17, wherein the process further comprises merging the correlation between the at least two of the data vectors for each of the at least two groups of data vectors.

Example 19 includes the subject matter of any of Examples 15-18, wherein the correlation is detected using a Neyman-Pearson binary hypothesis detector.

Example 20 includes the subject matter of any of Examples 15-19, further comprising causing a display device to display the correlation.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments the system 100 may include additional, fewer, or alternative subcomponents as compared to those included in the example embodiment of FIGS. 1 and 3.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate-level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some examples may be implemented, for example, using a machine-readable medium or article which may store an instruction or a set of instructions that, if executed by a machine, may cause the machine to perform a method and/or operations in accordance with an embodiment provided herein. Such a machine may include, for example, any suitable processing platform, computing platform, computing device, processing device, computing system, processing system, computer, process, or the like, and may be implemented using any suitable combination of hardware and/or software. The machine-readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A method of correlating signals, the method comprising:
    receiving, by a processor and via a signal receiver, a plurality of data vectors representing a plurality of signals;
    determining, by the processor and for each of the data vectors, a first plurality of correlation coefficients each based on a direct cross-correlation between each of the data vectors;
    calculating, by the processor, an average of the first plurality of correlation coefficients;
    determining, by the processor and for each of the data vectors, a second plurality of correlation coefficients each based on an indirect cross-correlation between each of the data vectors and the average of the first plurality of correlation coefficients; and
    detecting, by the processor, a correlation between at least two of the data vectors based on the second plurality of correlation coefficients.

2. The method of claim 1, further comprising estimating, by the processor, a probability that at least two of the data vectors are correlated based on the second plurality of correlation coefficients.

3. The method of claim 2, wherein the estimating is performed using a Fisher z-transform.

4. The method of claim 1, further comprising:
splitting, by a processor, a plurality of data vectors into at least two groups of data vectors,
wherein the second plurality of correlation coefficients is determined for each of the at least two groups of data vectors, and
wherein the correlation between the at least two of the data vectors is performed for each of the at least two groups of data vectors.

5. The method of claim 4, further comprising merging, by the processor, the correlation between the at least two of the data vectors for each of the at least two groups of data vectors.

6. The method of claim 1, wherein the correlation is detected using a Neyman-Pearson binary hypothesis detector.

7. The method of claim 1, further comprising causing, by the processor, a display device to display the correlation.

8. A signal correlation system comprising:
at least one signal receiver configured to receive a plurality of signals;
a data storage; and
at least one processor coupled to the data storage and configured to execute a process comprising:
receiving, via the at least one signal receiver, a plurality of data vectors representing the plurality of signals;
determining, for each of the data vectors, a first plurality of correlation coefficients each based on a direct cross-correlation between each of the data vectors;
calculating an average of the first plurality of correlation coefficients;
determining, for each of the data vectors, a second plurality of correlation coefficients each based on an indirect cross-correlation between each of the data vectors and the average of the first plurality of correlation coefficients; and
detecting a correlation between at least two of the data vectors based on the second plurality of correlation coefficients.

9. The system of claim 8, wherein the process further comprises estimating a probability that at least two of the data vectors are correlated based on the second plurality of correlation coefficients.

10. The system of claim 9, wherein the estimating is performed using a Fisher z-transform.

11. The system of claim 8, wherein the process further comprises:
splitting a plurality of data vectors into at least two groups of data vectors,
wherein the second plurality of correlation coefficients is determined for each of the at least two groups of data vectors, and
wherein the correlation between the at least two of the data vectors is performed for each of the at least two groups of data vectors.

12. The system of claim 11, further comprising merging the correlation between the at least two of the data vectors for each of the at least two groups of data vectors.

13. The system of claim 8, wherein the correlation is detected using a Neyman-Pearson binary hypothesis detector.

14. The system of claim 8, further comprising causing a display device to display the correlation.

15. A computer program product including one or more non-transitory machine-readable mediums encoded with instructions that when executed by one or more processors cause a process to be carried out for correlating signals, the process comprising:
receiving, via a signal receiver, a plurality of data vectors representing a plurality of signals;
determining, for each of the data vectors, a first plurality of correlation coefficients each based on a direct cross-correlation between each of the data vectors;
calculating an average of the first plurality of correlation coefficients;
determining, for each of the data vectors, a second plurality of correlation coefficients each based on an indirect cross-correlation between each of the data vectors and the average of the first plurality of correlation coefficients; and
detecting a correlation between at least two of the data vectors based on the second plurality of correlation coefficients.

16. The computer program product of claim 15, wherein the process further comprises estimating a probability that at least two of the data vectors are correlated based on the second plurality of correlation coefficients.

17. The computer program product of claim 15, wherein the process further comprises:
splitting a plurality of data vectors into at least two groups of data vectors,
wherein the second plurality of correlation coefficients is determined for each of the at least two groups of data vectors, and
wherein the correlation between the at least two of the data vectors is performed for each of the at least two groups of data vectors.

18. The computer program product of claim 17, wherein the process further comprises merging the correlation between the at least two of the data vectors for each of the at least two groups of data vectors.

19. The computer program product of claim 15, wherein the correlation is detected using a Neyman-Pearson binary hypothesis detector.

20. The computer program product of claim 15, further comprising causing a display device to display the correlation.

* * * * *